(12) United States Patent
D'Angelo et al.

(10) Patent No.: US 11,523,097 B2
(45) Date of Patent: Dec. 6, 2022

(54) PROCESS AND APPARATUS FOR THE CAPTURE OF PLENOPTIC IMAGES BETWEEN ARBITRARY PLANES

(71) Applicant: UNIVERSITA' DEGLI STUDI DI BARI ALDO MORO, Bari BA (IT)

(72) Inventors: Milena D'Angelo, Bari BA (IT); Augusto Garuccio, Bari BA (IT); Francesco Vincenzo Pepe, Bari BA (IT); Francesco Maria Di Lena, Casamassima BA (IT)

(73) Assignee: UNIVERSITA' DEGLI STUDI DI BARI ALDO MORO, Bari BA (IT)

( * ) Notice: Subject to any disclaimer, the term of this patent is extended or adjusted under 35 U.S.C. 154(b) by 0 days.

(21) Appl. No.: 17/290,373

(22) PCT Filed: Mar. 22, 2019

(86) PCT No.: PCT/IB2019/052351
§ 371 (c)(1),
(2) Date: Apr. 30, 2021

(87) PCT Pub. No.: WO2020/194025
PCT Pub. Date: Oct. 1, 2020

(65) Prior Publication Data
US 2021/0368154 A1    Nov. 25, 2021

(51) Int. Cl.
*H04N 13/128* (2018.01)
*H04N 13/254* (2018.01)
(Continued)

(52) U.S. Cl.
CPC ....... *H04N 13/128* (2018.05); *H04N 5/22541* (2018.08); *H04N 13/122* (2018.05);
(Continued)

(58) Field of Classification Search
CPC ............................ H04N 13/128; G02B 21/06
(Continued)

(56) References Cited

U.S. PATENT DOCUMENTS 7,620,309 B2    11/2009    Georgiev

FOREIGN PATENT DOCUMENTS

EP    3 220 185    9/2017

OTHER PUBLICATIONS

Francesco Di Lena et al: "Correlation Plenoptic Imaging: An Overview", Applied Sciences, vol. 8, No. 10, Oct. 1, 2018 (Oct. 1, 2018), p. 1958, XP055522422, CH ISSN: 2076-3417, DOI: 10.3390/app8101958 (Year: 2018).*

(Continued)

*Primary Examiner* — Amir Shahnami
(74) *Attorney, Agent, or Firm* — RMCK Law Group PLC

(57) ABSTRACT

A process and an apparatus for the plenoptic capture of photographic or cinematographic images of an object or a 3D scene (10) of interest are based on a correlated light emitting source and correlation measurement, along the line of "Correlation Plenoptic Imaging" (CPI). A first image sensor (Da) and a second image sensor (Db) detect images along a path of a first light beam (a) and a second light beam (b), respectively. A processing unit (100) of the intensities detected by the synchronized image sensors (Da, Db) is configured to retrieve the propagation direction of light by measuring spatio-temporal correlations between light intensities detected in the image planes of at least two arbitrary planes (P', P''; D'b, D''a) chosen in the vicinity of the object or within the 3D scene (10).

23 Claims, 4 Drawing Sheets

(51) Int. Cl.
  *H04N 13/122* (2018.01)
  *H04N 13/296* (2018.01)
  *H04N 13/239* (2018.01)
  *H04N 5/225* (2006.01)
  *G02B 21/06* (2006.01)
  *G02B 21/22* (2006.01)

(52) U.S. Cl.
  CPC ......... *H04N 13/239* (2018.05); *H04N 13/254* (2018.05); *H04N 13/296* (2018.05); *G02B 21/06* (2013.01); *G02B 21/22* (2013.01)

(58) Field of Classification Search
  USPC .......................................................... 348/47
  See application file for complete search history.

(56) References Cited

OTHER PUBLICATIONS

Francesco Di Lena et al : "Correlation Plenoptic Imaging: An Overview", Applied Sciences, vol. 8 , No. 10,Oct. 1, 2018.
Jeffrey H Shapiro: "Computational Ghost Imaging" ,a rxiv.org, Cornell University Library, 201 Olin Library Cornell University Ithaca, NY 14853,Jul. 16, 2008 (Jul. 16, 2008).
International Search Report and Written Opinion issued by the EPO dated Nov. 25, 2019 for PCT/IB2019/052351.

* cited by examiner

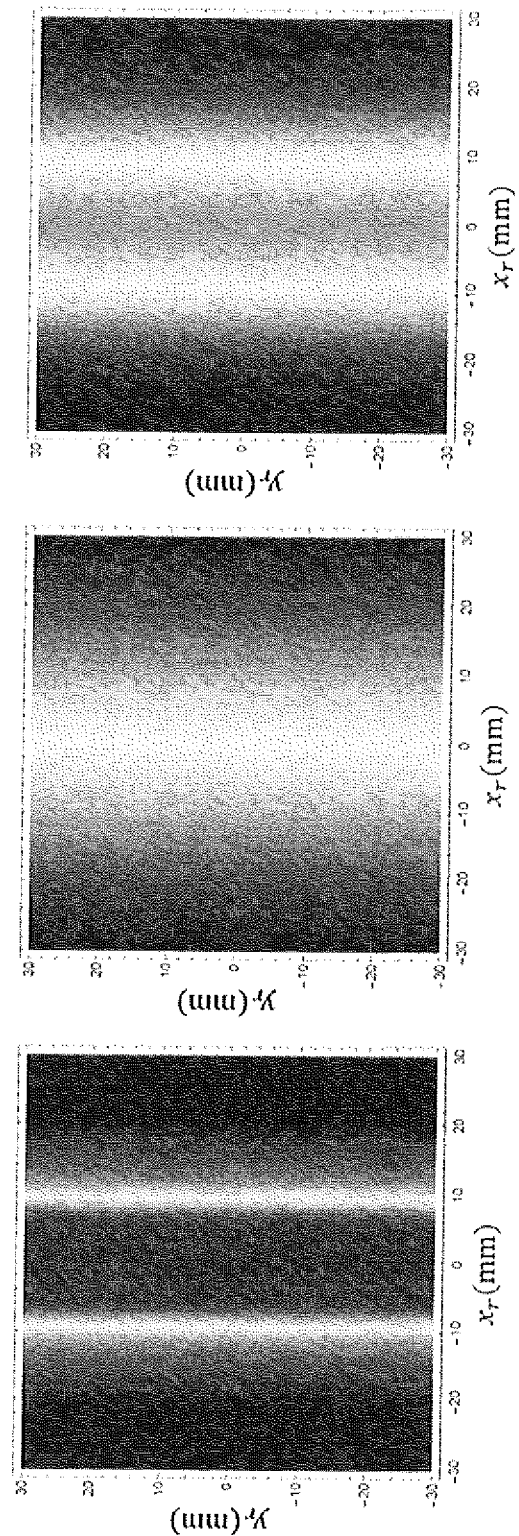

PROCESS AND APPARATUS FOR THE CAPTURE OF PLENOPTIC IMAGES BETWEEN ARBITRARY PLANES

This application is a U.S. national stage of PCT/IB2019/052351 filed on 22 Mar. 2019.

FIELD OF THE INVENTION

The present invention relates to a plenoptic image capturing technique to capture images in the field of photography, cinematography, microscopy and stereoscopy.

In particular, the plenoptic shooting process according to the present invention is a novel concept of Correlation Plenoptic Imaging (CPI) that can be defined as "Correlation Plenoptic Imaging between Arbitrary Planes" (CPI-AP).

Plenoptic Imaging (PI) is a technique aimed at recording both the location and the propagation direction of light in a given scene. Knowledge of the propagation direction is exploited, in post-processing, to geometrically re-trace the light path, thus enabling re-focusing different planes within the acquired image, extending the image depth of field (DOF) and reconstructing a tridimensional (3D) image.

PRIOR ART

Current plenoptic imaging systems resemble standard cameras having a conventional main lens and an image sensor, such as a CCD, a CMOS, etc. However, a microlens array is inserted in the native image plane and the sensor array is moved behind it. On one hand, the microlenses act as imaging pixels to gain the spatial information of the scene; on the other hand, they reproduce multiple images of the camera lens on the sensor, providing the angular information associated with each imaging pixel. As a result, the image resolution is reduced by a factor $N_u$ with respect to the diffraction limit set by the main lens numerical aperture, with $N_u$ the number of pixels per side associated to each microlens. Hence, standard plenoptic images are typically characterized by a poor resolution.

U.S. Pat. No. 7,620,309 describes a device for the plenoptic capture of images comprising a conventional main lens and an image sensor to digitally capture images. The described device also comprises a microlens array which, unlike other previously known devices, is arranged between the scene to be captured and the main lens of the device. In fact, this document suggests to decrease the number of microlenses. In this way, a reduced number of high-resolution images can be captured instead of a high number of low-resolution images, as is the case for the other previously known plenoptic devices. After detecting the image, an image processing device is required to obtain a large number of high-resolution images from the reduced number of high-resolution captured images.

Anyway, the capturing device described in U.S. Pat. No. 7,620,309 is not able to simultaneously increase the resolution of captured images and the number of original views of the scene to be captured. In fact, a high number of high-resolution views can be obtained only by means of an interpolation process following the capture of the low-resolution images.

A further problem of the plenoptic capturing devices of the known art is the poor achievable depth of field. This type of problem and the low angular resolution of the captured image are closely correlated, because the angular resolution is linked to the number of focused views that can be captured in a single plenoptic image, and therefore to the depth of field of the image.

A solution to the aforementioned problems of the known art is described in patent application n. EP3220185A1 in the name of the present Applicant. In this document, a process and device for the plenoptic capture are described, both based on the correlation measure or "Correlation Plenoptic Imaging" (CPI), wherein a primary light beam coming from at least one light source is split in two distinct light beams that are directed respectively towards a first image sensor to capture the angular measure and towards a second image sensor to capture the spatial measure.

Although by this solution high-resolution plenoptic images having high depth of field can be obtained, on the other side this solution does not allow real-time monitoring of the scene of interest during capturing. This problem is due to the fact that the first sensor captures the image of the light emitting source, while the second sensor captures the image (second-order or "ghost" image) of the scene as a result of measuring correlations between the two sensors, i.e. as a result of multiple captures by both sensors. Moreover, even if the device of EP3220185A1 does not entail a loss of resolution, acquiring the image of the focusing element is required for retrieving directional information; this is not always trivial, above all when complex imaging systems are used, such as a microscope, or a telescopic, objective. Another limitation of this scheme is that the image resolution of the scene of interest is defined by the numerical aperture of the light emitting source which could be difficult to control and optimize.

An object of the present invention is to solve the above-mentioned problems of the known prior art and to provide a process and an apparatus for the plenoptic capture of images that do not require the introduction of a microlens array.

Another object of the present invention is to provide a process and an apparatus for the plenoptic capture of images which enable to extend the depth of field and perform refocusing while maintaining the resolution of the focused images at the diffraction limit.

A further object of the invention is to provide a process and an apparatus which allow to maintain the advantages of plenoptic imaging, such as refocusing, increased depth of field, low-light imaging, 3D imaging etc., but without renouncing to diffraction-limited image resolution, and highly releasing the resolution versus depth of field compromise.

SUMMARY OF THE INVENTION

These and other objects of the present invention are achieved through a process for the plenoptic capture of photographic, cinematographic, microscopic or stereoscopic images of an object or a 3D scene of interest, comprising the steps of:
  providing a light emitting source;
  generating a first light beam and a second light beam coming from the light emitting source;
  directing the first light beam towards a first image sensor (e.g., CCD, CMOS, etc.) and the second light beam towards a second image sensor, the first light beam being adapted to be either reflected by the object or 3D scene or transmitted through the object or 3D scene.

The process of the present invention includes the step of retrieving the propagation direction of light by measuring spatio-temporal correlations between the light intensities detected by the two image sensors in the image planes of at least two arbitrary planes chosen in the vicinity of the object or within the 3D scene.

This enables to highly increase the maximum achievable depth of field of the plenoptic device, while maintaining high (diffraction-limited) resolution, as defined by the imaging lens. On the contrary, in the process described in the previous patent application n. EP3220185A1, two very precise imaging planes are imaged, namely, the plane of the focusing element and a plane within the scene of interest; this choice prohibits refocusing beyond the plane of the focusing element, thus highly restricting the range of accessible depth of field.

The present invention also offers a practical advantage when complex imaging systems, such as a microscope, or a telescopic, objective, are used as focusing elements.

Among the advantages of the present invention, it should be noted that no imaging of the focusing element is required and the real-time image of the object is immediately available by standard intensity measurement. Moreover, a further increase of the depth of field with respect to prior art is obtained thanks to the idea of imaging two arbitrary planes rather than imaging the focusing element and a generic plane of the object or 3D scene. For correlation measurement to be effective, the source must emit light characterized by spatio-temporal correlation.

Beside considering a chaotic light emitting source illuminating the object, the object can emit chaotic light by itself (e.g., it is a fluorescent object). Therefore, according to the present invention, the light emitting source can be an object or 3D scene which reflects/transmits the light from the chaotic source or can be the same object or 3D scene which emits the chaotic light.

Also, for the first time, the present invention allows the possibility of illuminating the object of interest with entangled photons/beams (e.g. emitted by spontaneous parametric down conversion). Again, the object will reflect/transmit the illuminating entangled photons/beams.

According to an aspect of the present invention, the image of the object or the 3D scene can be obtained by direct intensity measurement on a standard image sensor (e.g., CCD, CMOS, . . . ) such as, for example, the first image sensor. On the contrary, in the known scheme of EP3220185A1, intensity correlation measurement between the two image sensors is required to reconstruct the "ghost" image of the sample. Direct observation and monitoring of the sample, as well as comparison/integration with standard plenoptic imaging, are thus now possible.

The information about the propagation direction of light can be obtained by intensity correlation measurement between the two image sensors, both retrieving the standard (i.e., intensity) image of two arbitrary planes in the vicinity of the object or 3D scene. On the contrary, in the known scheme of EP3220185A1, one image sensor retrieves the standard image of the focusing element, while the other sensor retrieves the standard image of an "empty" plane, chosen in such a way to retrieve, by intensity correlation measurement between the two image sensors, the "ghost" image of a plane in the vicinity of the object or within the 3D scene. In both cases, correlation measurement between the two sensors are required for obtaining the propagation direction of light, and thus retracing light paths for refocusing and 3D imaging.

According to the present invention, the depth of field (DOF) of the original image can be enhanced by reconstructing the direction of light between the two arbitrary planes (P', P'''; D'$_b$, D''$_a$) and by retracing the light paths to obtain refocused images. The image of the object with enhanced depth of field or the 3D image of the scene can be reconstructed by stacking the refocused images.

According to an embodiment of the invention, the first light beam and the second light beam are quantum entangled beams generated, for example, by a spontaneous parametric down-conversion light (SPDC) emitting source. In this case, the object or 3D scene can be placed in the optical path of one of the two light beams, for example in the optical path of the second light beam.

The present invention also relates to an apparatus for the plenoptic capture of photographic, cinematographic, microscopic or stereoscopic images of an object or a 3D scene of interest, comprising:
- a first image sensor to detect images coming from the object or 3D scene along a path of a first light beam;
- a second image sensor to detect images coming from the object or 3D scene along a path of a second light beam;
- a processing unit of the intensities detected by the image sensors.

According to an embodiment of the present invention, the processing unit of the apparatus is configured to retrieve the propagation direction of light by measuring spatio-temporal correlations between the light intensities detected by the image sensors in the image planes of at least two arbitrary planes chosen in the vicinity of the object or within the 3D scene.

The apparatus further includes a main lens (or more complex imaging system) $L_f$, with positive focal length f and diameter D; the latter can also be the diameter of any other entrance pupil. The two arbitrary planes are placed at different distances $z_a$ and $z_b$ from the front principal plane of the main lens $L_f$.

The first image sensor is placed at a distance $z'_a$ from the back principal plane of the main lens $L_f$ and the second image sensor is placed at a distance $z'_b$ from the back principal plane of the main lens $L_f$.

An embodiment of the apparatus according to the invention can further include a splitting element placed between the main lens $L_f$ and the image sensors so as to generate the first light beam and the second light beam from a primary light beam coming from the object or 3D scene through the main lens $L_f$. Alternatively, the first light beam and the second light beam can also be the result of a free space propagation.

According to an embodiment, the apparatus according to the invention is configured to detect the first light beam and the second light beam from a source of entangled photons or beams, such as an SPDC emitting source.

In this case, the apparatus comprises two identical lenses $L_2$ of positive focal length $f_2$ whose back principal planes are placed at distances $z'_a$ and $z'_b$ from the image sensors along the respective paths of the first light beam and the second light beam. Lenses $L_2$ define two conjugate planes at distances $z_a=(1/f-1/z'_a)^{-1}$ and $z_b=(1/f-1/z'_b)^{-1}$, respectively, from the front principal planes of lenses $L_2$. The focused images of the at least two arbitrary planes are thus retrieved at different distances $z'_a$ and $z'_b$ from the back principal plane of said lenses $L_2$ along the respective paths of the first light beam and the second light beam.

The apparatus further includes an additional lens $L_1$ with focal length $f_1$ placed between the spontaneous parametric down-conversion light source and the two identical lenses $L_2$.

In all the embodiments of the apparatus according to the present invention, the first image sensor and the second image sensor can be distinct image sensor devices. In this case, a synchronization unit is also required to guarantee simultaneous measurements by the two image sensors. Alternatively, the first image sensor and the second image sensor can be two disjoint parts of a same image sensor device. Interestingly, also standard plenoptic devices (not exploiting correlated sources and correlation measurement) can be modified according to the present invention in order to increase the maximum available depth of field (DOF) without further reducing the resolution with respect to the state of the art.

BRIEF DESCRIPTION OF THE DRAWINGS

Further characteristics and advantages of the present invention will be more evident in the following description, given for illustrative purposes by referring to the attached figures, in which:

FIGS. 4A, 4B and 4C are comparison images to show the refocusing obtained with a process according to the present invention.

DETAILED DESCRIPTION

Figure 1:
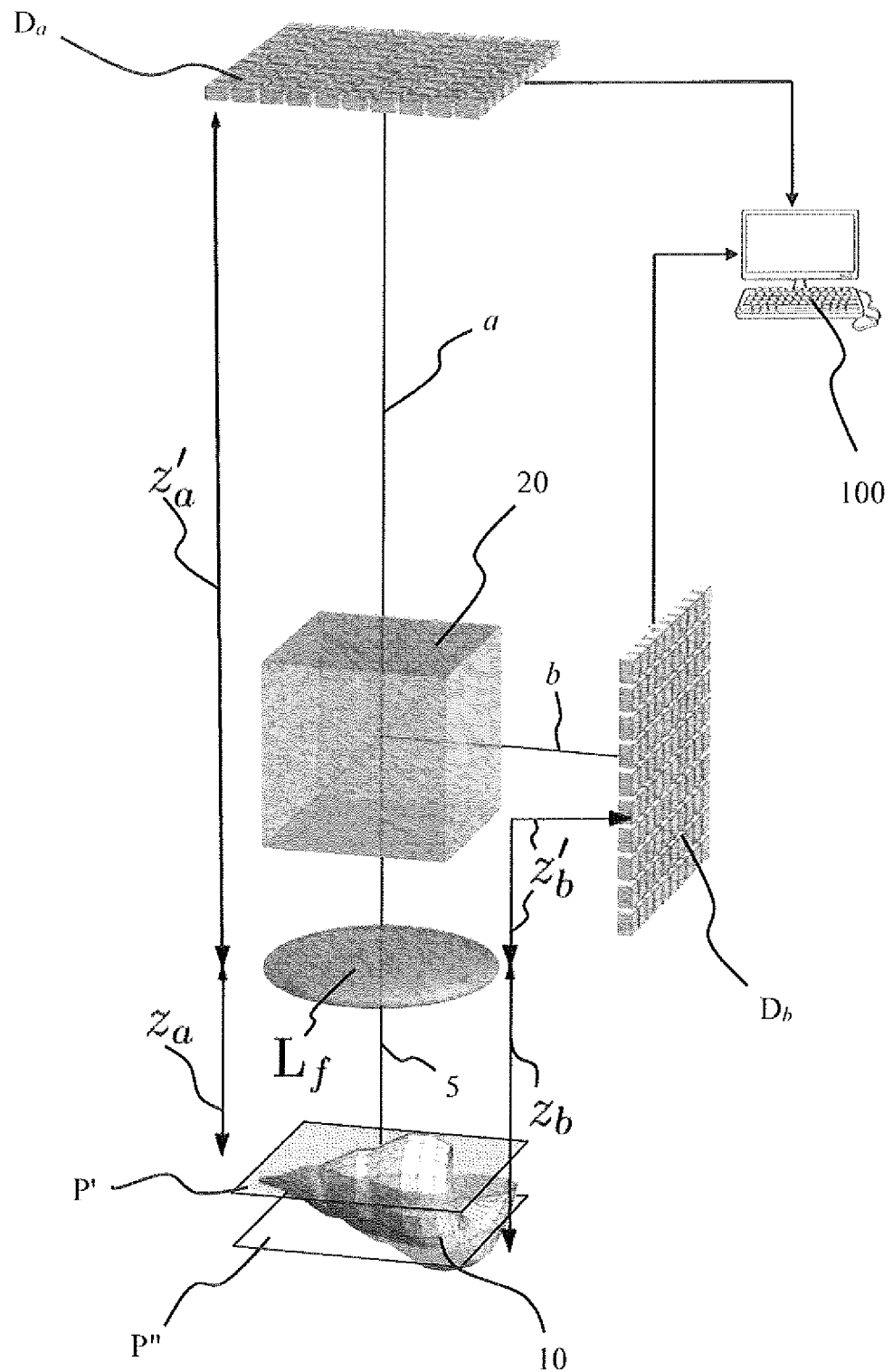
FIG. 1 is a schematic view of an apparatus according to an embodiment of the present invention.

In the schematic view of the apparatus shown in FIG. 1, the object 10 is considered as an emitter of chaotic light of wavelength $\lambda$.

A primary light beam 5 coming from the object 10 is collected by a lens $L_f$ supposed to be a thin lens in the figure, with positive focal length f and diameter D; the latter can also be the diameter of any other entrance pupil. After the lens $L_f$, a beam splitter 20 separates the collected light in two beams, denoted as a and b, impinging on image sensors $D_a$ and $D_b$, respectively. A processing unit 100 is connected to the image sensors $D_a$, $D_b$ to process the intensities detected by the synchronized image sensors.

The image sensors $D_a$ and $D_b$, placed, respectively, at a distance $z'_a$ and $z'_b$ from the thin lens $L_f$ (on the image side) retrieve the focused images of the planes P' and P" at a distance $z_a$ and $z_b$ from the thin lens $L_f$ (on the object side), according to the equation:

$$1/z_j + 1/z'_j = 1/f,$$

with magnification $$M_j = -z'_j/z_j,$$

with image resolution $\Delta x_j$ on the two planes $$\Delta x_j = 0.61 \lambda z_j / D,$$

and with depth of field $\Delta z_j$ $$\Delta z_j = 1.22 \lambda (z_j/D)^2$$

where j=a, b in all the equations above.

In the interesting cases in which the distance between the two planes P' and P" is larger than this natural depth of field, the intensities at the two image sensors $D_a$ and $D_b$ do not encode any relevant information about the volume enclosed by the two planes. For performing "Correlation Plenoptic Imaging between Arbitrary Planes" (CPI-AP), the correlation is measured between the intensity fluctuations retrieved at points $\rho_a$ and $\rho_b$ on the two synchronized image sensors $D_a$ and $D_b$, respectively; the correlation function is thus $$G(\rho_a, \rho_b) = \langle \Delta I_a(\rho_a) \Delta I_b(\rho_b) \rangle \quad (1)$$

where i=a, b and $\Delta I_i(\rho_i) = I_i(\rho_i) - \langle I_i(\rho_i) \rangle$ are the intensity fluctuations at points $\rho_i$ on the image sensor $D_i$ and the symbol $\langle \ldots \rangle$ denotes the statistical average over the emitted light. For light emitted by a stationary and ergodic source, the statistical average can be replaced by a time average over a sequence of frames.

By propagating the electromagnetic field in the setup described above, and indicating by $A(\rho_i)$ the aperture function of the object, placed at a distance z from the front principal plane of the lens $L_f$, and by $P(\rho_i)$ the lens pupil function, one gets $$G(\rho_a, \rho_b) = \left| \int d^2\rho_0 A \right| (\rho_0)|^2 p_a^*(\rho_0, \rho_a) p_b(\rho_0, \rho_b)|^2 \quad (2)$$

where $$p_j(\rho_0, \rho_j) = \int d^2\rho_l P(\rho_l) \exp\left\{ \frac{2\pi i}{\lambda} \left[ \left( \frac{1}{z} - \frac{1}{z_j} \right) \frac{\rho_l^2}{2} - \left( \frac{\rho_0}{z} - \frac{\rho_j}{M_j z_j} \right) \cdot \rho_l \right] \right\} \quad (3)$$

with j=a, b, $p_a^*$ is the complex conjugate of $p_a$, $\rho_0$ is the coordinate on the object plane and $\rho_l$ the coordinate on the lens plane. By integrating $G(\rho_a, \rho_b)$ over one of the two image sensor coordinates, let's say $\rho_a$ (or $\rho_b$), one would get the focused incoherent image of the plane placed at a distance $z_b$ (or $z_a$) from the front principal plane of the lens $L_f$. In particular, if the object is placed exactly in $z=z_b$ (or $z=z_a$), such integral gives an image of the object (known as "ghost image") characterized by the same resolution, depth of field and magnification of the image directly retrieved by $D_b$ (or $D_a$) through intensity measurements. In other words, the "ghost image" has the same characteristics of the standard image.

If the object is placed in $z \neq z_b$ (or $z \neq z_a$), such integral gives an out-of-focus image of the object.

However, the dependence of $G(\rho_a, \rho_b)$ on both the planar coordinates $\rho_a$ and $\rho_b$ is much more informative, and enables to reconstruct the direction of light between the two planes, and beyond them, and thus to refocus the object aperture function independently of its location within the setup. This can be easily seen in the geometrical optics limit ($\lambda \to 0$), where the effects of diffraction are negligible:

$$G(\rho_a, \rho_b) \approx \quad (4)$$

$$C \left| A\left( \frac{1}{z_b - z_a} \left( \frac{z - z_a}{M_b} \rho_b - \frac{z - z_b}{M_a} \rho_a \right) \right) \right|^4 \cdot \left| P\left( \frac{1}{z_b - z_a} \left( \frac{z_b}{M_a} \rho_a - \frac{z_a}{M_b} \rho_b \right) \right) \right|^4$$

where C is an irrelevant constant. A proper parametrization of the correlation function can be implemented to decouple the object aperture function A from the lens pupil function P, thus leading to several refocused images, one for each value of $\rho_s$ $$G_{ref}(\rho_r, \rho_s) = \quad (5)$$

$$G\left( \frac{M_a}{z} [(z_a \rho_r + (z - z_a)\rho_s)], \frac{M_b}{z} [(z_b \rho_r + (z - z_b)\rho_s)] \right) \approx C|A(\rho_r)|^4 |P(\rho_s)|^4$$

where $\rho_r$ an $\rho_s$ are the points on the object an on the lens plane, respectively, that give the most relevant contribution to the correlation function. After the refocusing operation (5), applied to the measured correlation function, integration over the planar coordinate $\rho_s$ provides the refocused image of the object aperture, independent of its original position, i.e. on its displacement, $z-z_a$ and $z-z_b$, from the plane conjugate to each image sensor plane:

$$\Sigma_{ref}(\rho_r) = \int d^2\rho_s G_{ref}(\rho_r, \rho_s) \approx C'|A(\rho_r)|^4 \qquad (6)$$

with C' another irrelevant constant.

The limits to the refocusing operation do not appear in the geometrical optics regime; such limits can be obtained from the exact expression of the correlation function in Equations (2) and (3), which include the effects of interference and diffraction, as determined by the wave nature of light.

Figure 2:
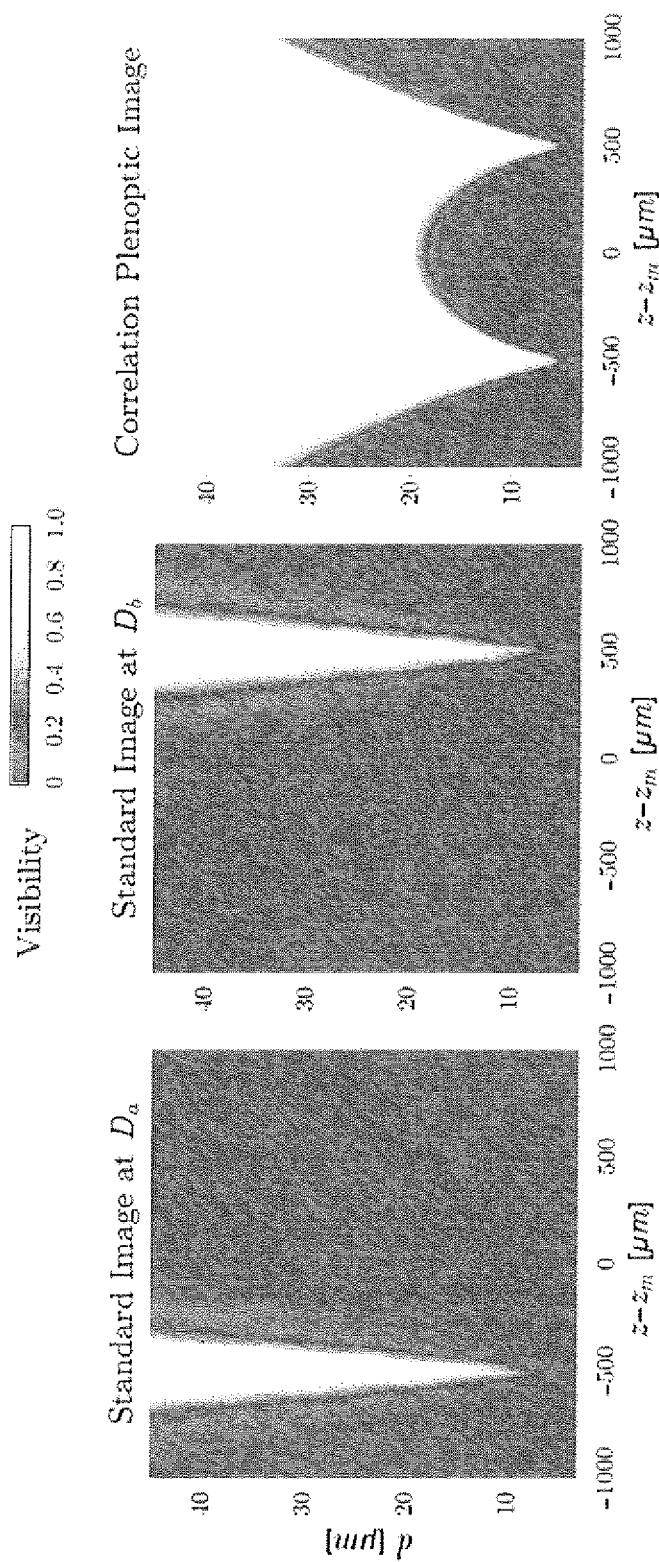
FIGS. 2A, 2B and 2C are comparison images to show the depth of field enhancement obtained with a process according to the present invention.

FIGS. 2A, 2B and 2C report density plots of the visibility of images of a double-slit mask, with center-to-center distance d and width d/2, as a function of the slit separation d (representing the resolution) and the distance $z-z_m$ between the object plane and the farther refocusing plane (representing the maximum achievable depth of field). These plots allow to visualize the depth of field enhancement entailed by the refocusing procedure as a function of resolution and maximum achievable.

FIGS. 2A and 2B ("standard" images) show the visibility of the image of the double-slit mask, as obtained by standard imaging at retrieved by both image sensors $D_a$ and $D_b$; FIG. 2C reports the visibility of the image of the double-slit mask obtained by correlation plenoptic imaging according to the principle of the present invention. In the previous patent application n. EP3220185A1, the density plot of the visibility is identical to the one in FIG. 2C, only for values $z-z_m>0$; no refocusing is possible for $z-z_m<0$.

In the standard images (FIGS. 2A and 2B), the DOF increases linearly with decreasing resolution, and the two slits can only be distinguished in a narrow region around the focusing distance. In the CPI-AP technique of the present invention, the DOF of the refocused image according to ($\Sigma_{ref}(\rho_r)$) is highly enhanced (FIG. 2C) with respect to the mere combination of the DOF associated with the images of FIGS. 2A and 2B retrieved by $D_a$ and $D_b$, separately. In the proposed simulation, for example, the image of a double-slit having d=18 m has a DOF=0.35 mm in standard imaging (FIGS. 2A and 2B), and a DOF=1.4 mm in the applied technique CPI-AP (FIG. 3C). Hence, the depth of field enhancement is by a factor of 4 with respect to standard imaging, and by a factor of 2 with respect to the prior art.

Figure 3:
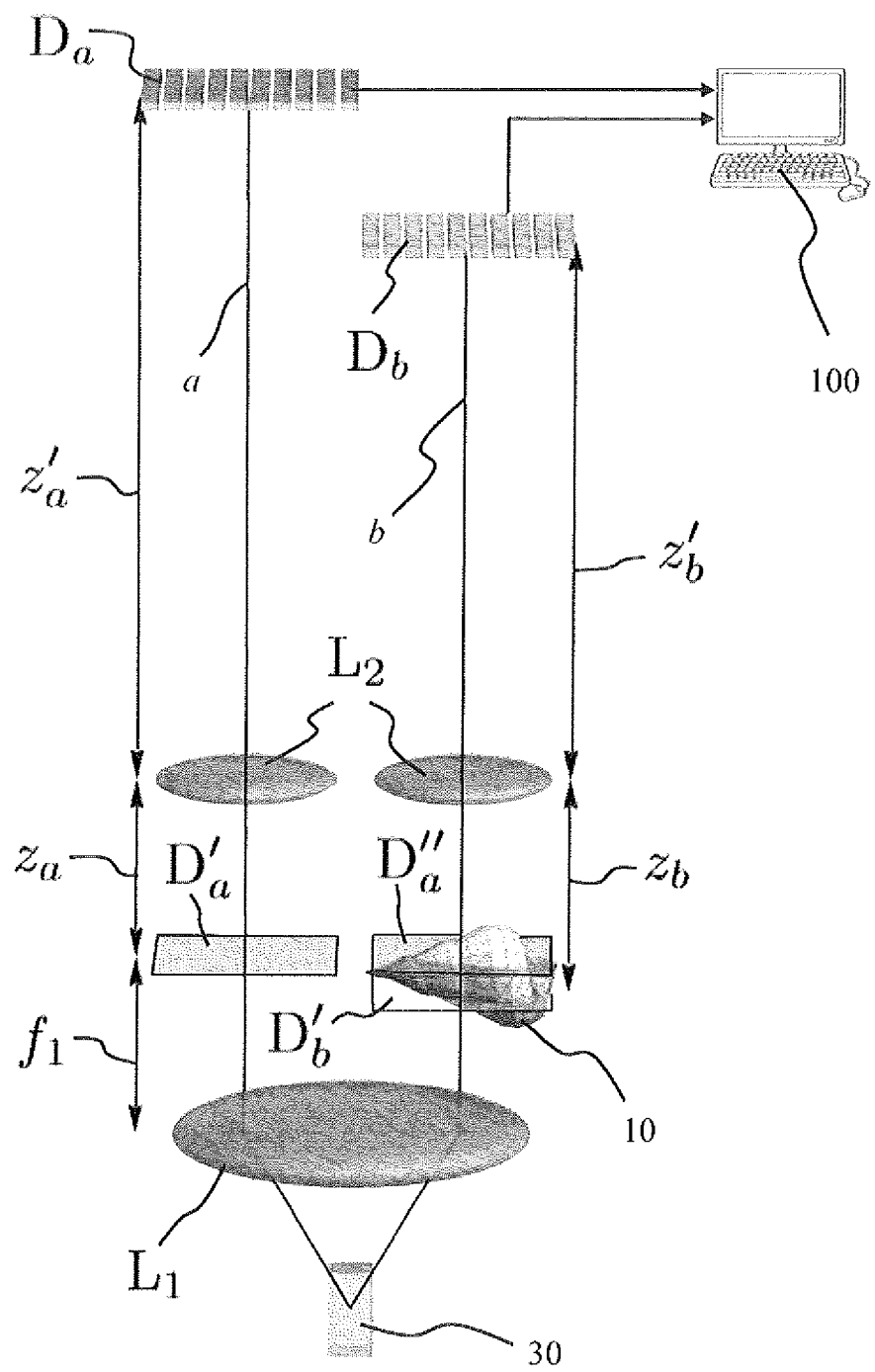
FIG. 3 is a schematic view of an apparatus according to another embodiment of the present invention.

FIG. 3 shows another embodiment of an apparatus according to the present invention which is designed in case the illuminating source emits entangled photons, e.g., by spontaneous parametric down-conversion (SPDC). A processing unit 100 is connected to image sensors $D_a$ and $D_b$ to process the intensities detected by the synchronized image sensors.

The apparatus of FIG. 3 includes two identical lenses $L_2$ (here supposed to be thin lenses for simplicity) of focal length f>0 that are placed at distances $z'_a$ and $z'_b$ from the image sensors $D_a$ and $D_b$ and defines two conjugate planes $D'_a$ and $D'_b$, at distances $z_a = (1/f - 1/z'_a)^{-1}$ and $z_b = (1/f - 1/z'_b)^{-1}$, respectively.

A transmissive object 10 is placed in the optical path labelled by b. The planes $D'_a$ and $D''_a$, both at a distance $z_a$ from the lens $L_2$ (on the object side), are in the focal plane of an additional lens $L_1$ (also supposed to be a thin lens for simplicity), with focal length $f_1>0$. Lens $L_1$ collects the two correlated beams emitted by the SPDC source 30. Due to the correlation between the two beams, a "ghost image" of the plane $D''_a$ is reproduced in the plane $D'_a$ when correlation (or coincidence) measurements are measured between $D_a$ and $D_b$. Hence, in the optical path a, the lens $L_2$ serves for focusing the "ghost image" of the plane $D''_a$ on the image sensor $D_a$. The refocused image is still given by Equation (5), upon replacing $M_a = -z'_a/z_a$ with $-M_a$. However, due to the finite aperture of the lenses $L_2$, characterized by the pupil function $\rho_2$, the refocused image is slightly complicated by the presence of an envelope function, namely:

$$\Sigma_{ref}(\rho_r) = \int d^2\rho_s G_{ref}(\rho_r, \rho_s) \approx C'\eta(\rho_r)|A(\rho_r)|^4 \qquad (6.1)$$

with $$\eta(\rho_r) = \int d^2\rho_s \left| P_2(\rho_s) P_2\left(-\rho_s + \frac{2z_a}{z}(\rho_r - \rho_s)\right) \right|^2 \qquad (7)$$

The envelope function is due to the asymmetry between the two light paths; in fact, different from the setup illuminated by chaotic light previously disclosed for the embodiment of FIG. 1, here the object 10 is not in common between the two paths a and b. However, if the object size is significantly smaller than the lens size, the envelope is constant with respect to $\rho_r$ with good approximation.

In the images of FIGS. 4A, 4B and 4C it is shown the refocusing obtained with a process according to the present invention. The figures represent three different images of a vertical double slit, with center-to-center distance d=21 μm, placed in the midpoint of two object planes at $z_a=35.55$ mm and $z_b=36.55$ mm of a lens $L_f$ or $L_1$ with focal length f=28.84 mm and numerical aperture NA=0.1.

The refocused image of FIG. 4A is obtained with the algorithm defined in Equation (6) and can be compared with the out-of-focus image of FIG. 4B detected on $D_a$ and the refocused image of FIG. 4C obtained by plenoptic imaging of the prior art with $N_u=3$.

Various modifications can be made to the embodiments herein depicted for illustrative purposes, without departing from the scope of the present invention as defined by the attached claims. For example, the two beams along the light paths a and b can be either naturally diverging from each other or made divergent by the insertion of additional optical elements (beam splitters and mirrors). Each lens in all the embodiments can always be replaced by a more complex imaging system. In the embodiment of FIG. 3, both $L_1$ and $L_2$ can either be a single wide lens or two separate lenses, one for the light path a and one for the light path b. In the embodiment of FIG. 3, the SPDC source can be replaced by any emitting source of entangled photons or beams. Moreover, a light emitting source can be employed to illuminate the object or the 3D scene in the scheme of FIG. 1; the source must be chaotic for generic reflective/transmissive/scattering objects, and can be a laser for objects emitting chaotic light (e.g., fluorescent objects).

The invention claimed is:
1. A process for the plenoptic capture of photographic, cinematographic, microscopic or steroscopic images of an object or a 3D scene of interest, comprising the steps of:
   providing a light emitting source;
   generating a first light beam (a) and a second light beam (b) coming from said light emitting source;
   directing said first light beam (a) towards a first image sensor (Da) and said second light beam (b) towards a second image sensor (Db), said second light beam (b)

being adapted to be either reflected by said object or 3D scene (10) or transmitted through said object or 3D scene (10);

retrieving via the second image sensor, a focused image of a first arbitrary plane chosen in a vicinity of the objector within the 3D scene (10), and retrieving a non-focused image of a second arbitrary plane chosen in the vicinity of the object or within the 3D scene (10), wherein the first arbitrary plane and the second arbitrary plane are planes other than a focusing element plane or a light source plane;

retrieving, via the first image sensor, one of a focused image or a ghost image of the second arbitrary plane; and retrieving the propagation direction of light by measuring spatio-temporal correlations between the light intensities detected by said first and second image sensors (Da, Db) in the image planes of said first and second arbitrary planes (P', P''; D'b, D''a).

2. The process according to claim 1, wherein said light emitting source is selected from an object or 3D scene (10) which reflects/transmits the illuminating chaotic light and a chaotic light emitting object or 3D scene (10).

3. The process according to claim 1, wherein the information about the propagation direction of light is obtained by measuring the correlation between the intensity fluctuations retrieved at points $\rho_a$ and $\rho_b$ on said image sensors ($D_a$, $D_b$) according to the correlation function $$G(\rho_a, \rho_b) = \langle \Delta I_a(\rho_a) \Delta I_b(\rho_b) \rangle$$

where i=a, b and $\Delta I_i(\rho_i) = I_i(\rho_i) - \langle I_i(\rho_i) \rangle$ are the intensity fluctuations at points $\rho_i$ on the image sensor $D_i$, the symbol $\langle \ldots \rangle$ denoting the statistical average over the emitted light.

4. The process according to claim 1, wherein the depth of field (DOF) of the original image is enhanced by reconstructing the direction of light between said two arbitrary planes (P', P''; D'$_b$, D''$_a$) and by retracing the light paths to obtain refocused images.

5. The process according to claim 4, wherein the image of the object with enhanced depth of field or the 3D image of the scene is reconstructed by stacking said refocused images.

6. The process according to claim 1, wherein a primary beam (5) of chaotic light coming from said object or 3D scene (10) is collected by a main lens ($L_f$), and wherein said first light beam (a) and said second light beam (b) are generated by splitting said primary light beam (5) by means of a splitting element (20).

7. The process according to claim 6, wherein said first image sensor ($D_a$) is placed at a distance ($z'_a$) from the back principal plane of said main lens ($L_f$) and retrieves the focused image of a first plane (P') at a distance ($z_a$) from the front principal plane of said main lens ($L_f$), and wherein said second image sensor ($D_b$) is placed at a distance ($z'_b$) from the back principal plane of said main lens ($L_f$) and retrieves the focused image of a second plane (P''') at a distance ($z_b$) from the front principal plane of said main lens ($L_f$).

8. The process according to claim 1, wherein said first light beam (a) and said second light beam (b) are quantum entangled beams generated by a source of entangled photons, or beams (30).

9. The process according to claim 8, wherein two identical lenses ($L_2$) of focal length $f_2$ are placed in such a way that their back principal planes are at distances ($Z'_a$) and ($z'_b$) from the image sensors ($D_a$) and ($D_b$), respectively, and define two conjugate planes (D'$_a$) and (D'$_b$) at distances $z_a = (1/f - 1/z'_a)^{-1}$ and $z_b = (1/f - 1/z'_b)^{-1}$, respectively, from the front principal planes of said lenses ($L_2$).

10. The process according to claim 8, wherein an additional lens ($L_1$) with focal length ($f_1$) collects the two correlated beams emitted by said entangled photon or beam source (30).

11. The process according to claim 8, wherein said object or 3D scene (10) is placed in the optical path of one of said light beams (a, b).

12. The process according to claim 8, wherein a plane (D''$_a$) parallel to said planes (D'$_a$, D'$_b$) is defined along the optical path of said second light beam (b) at a distance ($z_a$) from the relevant lens ($L_2$), and wherein a "ghost image" of the plane (D''$_a$) is reproduced in the plane (D'$_a$) when correlation or coincidence measurements are measured between said image sensors ($D_a$) and ($D_b$).

13. An apparatus for the plenoptic capture of photographic, cinematographic, microscopic or stereoscopic images of an object or a 3D scene (10) of interest, comprising:

a first image sensor ($D_a$) to detect images coming from said object or 3D scene (10) along a path of a first light beam (a);

a second image sensor ($D_b$) to detect images coming from said object or 3D scene (10) along a path of a second light beam (b);

a processing unit (100) of the intensities detected by said image sensors ($D_a$, $D_b$);

wherein said processing unit is configured to:

retrieve, via the second image sensor, a focused image of a first arbitrary plane chosen in a vicinity of the object or within the 3D scene, and retrieve a non-focused image of a second arbitrary plane chosen in the vicinity of the object or within the 3D scene, wherein the first arbitrary plane and the second arbitrary plane are planes other than a focusing element plane or a light source plane;

retrieve, via the first image sensor, one of a focused image or a ghost image of the second arbitrary plane; and retrieve the propagation direction of light by measuring spatio-temporal correlations between the light intensities detected by said first and second image sensors ($D_a$, $D_b$) in the image planes of the first and second arbitrary planes (P', P''; D'$_b$, D''$_a$).

14. The apparatus according to claim 13, further including a main lens ($L_f$), wherein the focused images of said at least two arbitrary planes (P', P'') are retrieved at different distances ($z_a$) and ($z_b$) from the front principal plane of said main lens ($L_f$).

15. The apparatus according to claim 13, wherein said first image sensor ($D_a$) is placed at a distance ($z'_a$) from the back principal plane of said main lens ($L_f$) and said second image sensor ($D_b$) is placed at a distance ($z'_b$) from the back principal plane of said main lens ($L_f$).

16. The apparatus according to claim 13, further including a splitting element (20) placed between said main lens ($L_f$) and said image sensors ($D_a$, $D_b$) so as to generate said first light beam (a) and said second light beam (b) from a primary light beam (5) coming from said object or 3D scene (10) through said main lens ($L_f$).

17. The apparatus according to claim 13, further including a light emitting source, wherein said light emitting source is an object or 3D scene (10) which reflects/transmits the light from a chaotic source or it is the same object or 3D scene (10) which emits the chaotic light.

18. The apparatus according to claim 13 which is configured to detect said first light beam (a) and said second light beam (b) from an entangled photons or beams light source (30).

19. The apparatus according to claim 13, wherein two identical lenses ($L_2$) of focal length ($f_2$) are placed in such a way that their back principal planes are at distances ($z'_a$) and ($z'_b$) from the image sensors ($D_a$) and ($D_b$), respectively, along the respective paths of said first light beam (a) and said second light beam (b) and define two conjugate planes ($D'_a$) and ($D'_b$) at distances $z_a(1/f-1/z'_a)^{-1}$ and $z_b=(1/f-1/z'_b)^{-1}$, respectively, from the front principal planes of said lenses ($L_2$).

20. The apparatus according to claim 13, wherein the focused images of said at least two arbitrary planes ($D'_b$, $D''_a$) are retrieved at different distances ($z'_a$) and ($z'_b$) from the back principal planes of said lenses ($L_2$).

21. The apparatus according to claim 13, further including an additional lens ($L_1$) with focal length ($f_1$) placed between said entangled photon or beam source (30) and said two identical lenses ($L_2$).

22. The apparatus according to claim 13, wherein said first image sensor ($D_a$) and said second image sensor ($D_b$) are distinct, synchronized, image sensor devices.

23. The apparatus according to claim 13, wherein said first image sensor and said second image sensor are two disjoint parts of a same image sensor device.

\* \* \* \* \*